United States Patent
Dickens et al.

(10) Patent No.: US 10,091,456 B2
(45) Date of Patent: Oct. 2, 2018

(54) ON-SCREEN DISPLAY SYSTEMS

(71) Applicant: Adder Technology Limited, Cambridge (GB)

(72) Inventors: Nigel Anthony Dickens, Cambridge (GB); Douglas Gilchrist Reid, Cambridge (GB)

(73) Assignee: Adder Technology Limited, Cambridge (GB)

(*) Notice: Subject to any disclaimer, the term of this patent is extended or adjusted under 35 U.S.C. 154(b) by 50 days.

(21) Appl. No.: 15/006,809

(22) Filed: Jan. 26, 2016

(65) Prior Publication Data
US 2016/0227149 A1    Aug. 4, 2016

(51) Int. Cl.
| | |
|---|---|
| H04N 5/265 | (2006.01) |
| H04N 21/431 | (2011.01) |
| H04N 7/10 | (2006.01) |
| H04N 5/345 | (2011.01) |
| H04N 5/225 | (2006.01) |
| G11B 27/00 | (2006.01) |

(52) U.S. Cl.
CPC .......... *H04N 7/104* (2013.01); *G11B 27/00* (2013.01); *H04N 5/225* (2013.01); *H04N 5/265* (2013.01); *H04N 5/345* (2013.01); *H04N 7/108* (2013.01); *H04N 21/4318* (2013.01)

(58) Field of Classification Search
CPC .... H04N 7/104; H04N 21/4318; H04N 5/265; H04N 7/108; G11B 27/00
USPC ......................................................... 725/105
See application file for complete search history.

(56) References Cited

U.S. PATENT DOCUMENTS

| | | | |
|---|---|---|---|
| 8,473,651 B1 * | 6/2013 | Sundaravel | G06F 21/305 710/1 |
| 2005/0132403 A1 | 6/2005 | Lee et al. | |
| 2005/0140566 A1 * | 6/2005 | Kim | G06F 3/1431 345/1.1 |
| 2007/0136498 A1 | 6/2007 | Tseng et al. | |
| 2008/0049143 A1 * | 2/2008 | Liao | H04N 5/44508 348/569 |
| 2008/0218633 A1 * | 9/2008 | Shen | G06F 3/14 348/496 |
| 2010/0251294 A1 * | 9/2010 | Ooi | H04N 5/44591 725/37 |
| 2016/0119624 A1 * | 4/2016 | Frishman | H04N 19/136 375/240.02 |

FOREIGN PATENT DOCUMENTS

GB    2489724    5/2011

OTHER PUBLICATIONS

GB Search Report dated Aug. 16, 2016 from GB Application No. 1501797.3.

* cited by examiner

*Primary Examiner* — Hung H Lam
(74) *Attorney, Agent, or Firm* — Beyer Law Group LLP

(57) ABSTRACT

Apparatus, systems and methods for generating a hybrid on screen display are described. A background image portion of a user interface is generated at a switching device. Video data representing the background image portion of the user interface is transmitted to a user station of a user console. The video data is modified at the user station as it is received using video data representing a user interface element that is specific to the user station. A customized user interface is displayed on a display device attached to the user station.

34 Claims, 10 Drawing Sheets

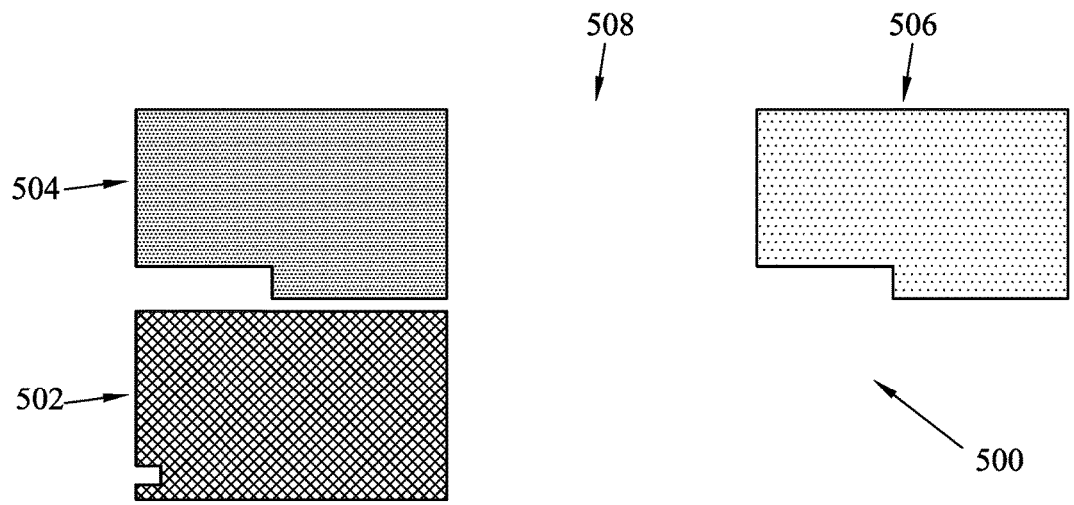
FIG. 8
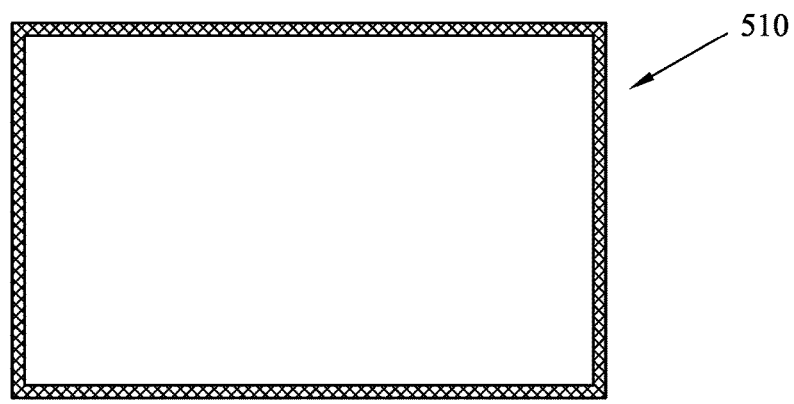
FIG. 9
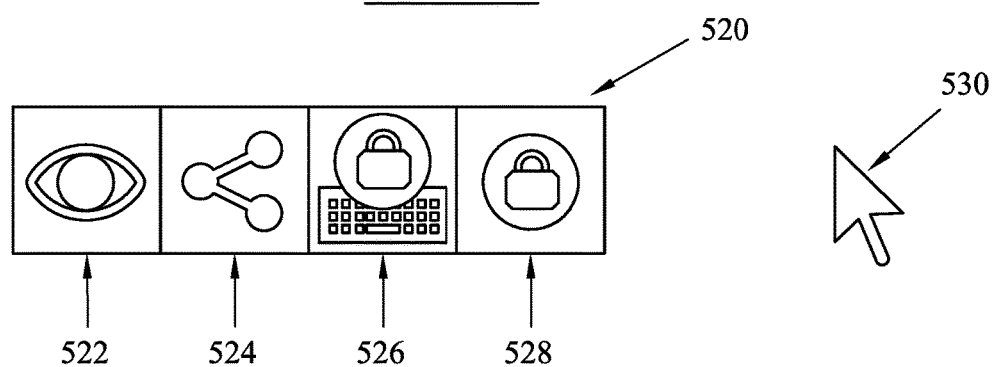
FIG. 10
FIG. 11

ON-SCREEN DISPLAY SYSTEMS

CROSS-REFERENCE TO RELATED APPLICATIONS

This application claims priority of GB Application No. 1501797.3, filed on Feb. 3, 2015, which is incorporated herein by reference in its entirety.

The present invention relates to display systems and in particular to on-screen display apparatus, systems, and methods of operation, which can be used when accessing multiple different computers.

The present invention is particularly applicable to Keyboard Video and Mouse (KVM) switches and can provide simpler, lower cost, and higher functionality on-screen computer selection menus for multiple users while still realising the visually compelling experience expected by users of modern computing equipment.

Traditional Keyboard, Video and Mouse (KVM) switches have been available for many years. KVM switches enable one or more users to access and control multiple computers. Smaller KVM switches often support a single KVM user console and connect to a plurality of computers using standard USB, video and audio cables (sometimes referred to as "native cables"). Computer selection is typically achieved by selection buttons on the switch or special keyboard sequences known as hotkeys.

The native cabling approach is impractical for larger KVM switches due to the bulk and cumbersome nature of native cables. Consequently CATx style KVM switches may be used for larger installations. For CATx KVM switches, a dongle is provided at each computer to convert the native USB, video and audio signals into a form that can be transmitted over a 4-pair twisted wire network-style CAT5, 5e, 6 or 7 cable. At each user console, a user station converts the CATx signals back into their native form for delivery to the keyboard, mouse, display, audio and other USB devices. The approach means that the KVM switch that links the dongles and the user stations together can be constructed using neat 8P8C network-style connectors (also sometimes referred to as RJ45 connectors). Consequently a practically sized KVM switch can be constructed that supports many computers and many user consoles and hence users. Computer selection is typically carried out using hotkey keyboard sequences or hotkey-triggered on-screen displays.

Typically the on-screen display generation circuit is located within the user station but this increases the complexity, size and cost of the user station. This also reduces the practicality of providing a user station and dongle as a stand-alone KVM extender. Such stand-alone KVM extenders are useful in their own right in various application fields, including broadcast, medical, industrial, command and control, education, banking, and other fields of application.

Another approach is to implement multiple individual on-screen display circuits within the central switch itself, rather than in each user station. However, this approach is only practicable if the KVM installation is to use most of the user connections provided by the KVM switch, otherwise the extra on-screen display circuits within the KVM switch are effectively redundant.

CATx KVM switches supporting analogue video signals are widely available. However analogue video interfaces are becoming obsolete as digital video interfaces, such as DVI, HDMI, DisplayPort and Thunderbolt, become prevalent. This presents challenges for KVM switch manufacture, as digital video signals generally require more complex circuitry to handle, switch and extend owing to the higher bandwidths involved.

This has led to the development of a new generation of networked digital KVM systems. These typically include transmitter units for connection to a computer and receiver units for connection to user consoles. The transmitter and receiver units convert the native USB, video and audio signals to and from Ethernet network signals that can then be transmitted and routed using standard networking infrastructure. Such systems provide high levels of functionality and convenience with graphically rich user interfaces and are suitable for larger, higher-end installations. The receiver units typically run an embedded operating system, such as Linux, and contain a frame store. In order to operate over practical networking infrastructure, the transmitter units typically require image compression circuitry and the receiver units typically require image de-compression circuitry.

However, this approach can be too complex and technically sophisticated for medium sized KVM switch installations that may only need to support, for example, up to 8 users and 16 computers. The ideal solution for such medium sized KVM switch installations would be a digital video version of the traditional analogue video multi-user CATx KVM switch. However, there are problems involved with creating such a solution.

A first set of problems relate to providing a dongle that can support digital video signals, transmit video and USB signals over a common CATx cable and preferably operate at sufficiently low power levels to be interface powered from a single USB connection.

However, users of a multi-user digital CATx switch also require an on-screen computer selection menu. General advancements in computer technology means that users expect computing equipment to deliver a visually rich experience, even on the computer selection screen of a KVM switch. It would be possible to implement such video generation technology into the user station unit but this would require a frame store and some of the other circuit complexity found in the network based solutions and hence is a complex and costly approach.

Furthermore, such a user station would not make a commercially practicable stand-alone KVM extender when coupled to a dongle.

Adopting the approach of putting multiple on-screen display generation circuits into the central KVM switch would also be a complex and costly approach. Cheap on-screen display chips could be used in analogue CATx switches to generate the required menus, but this may only be practicable for smaller numbers of user stations for example four or fewer. Furthermore the quality of the on-screen displays generated is more akin to a command line interface of the first PC's running DOS than to a modern computer and therefore does not meet modern user expectations.

An additional problem involves the complexity of the digital video switching circuitry required to switch these on-screen display signals to the user station.

Hence, there are currently no viable practicable solutions to the problem of providing high graphical quality and functionality on-screen computer selection menus on a digital CATx KVM switch.

Hence, a device which solved this problem would be advantageous, especially when coupled with a low power, simple dongle, as it would deliver a practical digital CATx KVM switch which is a desirable solution for medium sized KVM matrix installations.

A first aspect of the invention provides a user station comprising: an input interface for receiving an input video signal; an output interface for outputting an output video signal to a display device; a video processing device in communication with the input interface and the output interface and configured to modify video data representing a background portion of a user interface to add a further user interface element which customises the user interface as the video data is received from the input interface and to transmit the modified video data to the output interface.

The video data representing the background image of the user interface is modified as it received to include one or more user interface elements. Hence, there is no need to include more complex or expensive circuitry in the user station to locally store the video data, such as a frame store or similar. Rather the background image is modified on the fly as the video data passes between the input interface and output interface via the video processing device.

The or each further user interface element may customise the user interface to be specific to the user station. Hence, the user interface represented by the video data output by the user station is particular to the user station.

The video processing device may be configured to use alpha blending to modify the video data.

The video processing device may be further configured to modify the video data by using compressed image data representing the or each further user interface element.

The video processing device may be further configured to modify the video data by using bitmap image data representing the or each further user interface element.

Compressed image data may represent a first further user interface element and bitmap image data may represent a second further user interface element.

The compressed image data and/or bitmap image data may have been received via the input interface.

The background portion of the user interface may include a plurality of portions each relating to and/or identifying a respective one of a plurality of sources of video. Each of the plurality of sources of video may be a computer.

The background portion of the user interface may include a plurality of video elements. Each video element may correspond to the video output of a different source of video. Each video element may be a thumbnail. Each thumbnail may be an image corresponding to a display output or screen shot of a computer.

The video processing device may be further configured to output video data received from the input interface to the output interface.

The video processing device may be further configured to reconstitute video from video data received from the input interface and representing a video output of a video source and output the reconstituted video data to the output interface.

The video processing device may be a programmable logic device. For example, the video processing device may be an FPGA.

The further user interface element may comprises one or more of a mask image, a highlighter image, one or more icons or a pointer image.

The input interface may include a connector for receiving a CATx cable connector. The output interface may be a digital video interface and/or may include a connector for receiving a digital video cable connector.

A second aspect of the invention provides a switching device for selectively connecting a user station to one of a plurality of computers, the switching device comprising; a plurality of computer interfaces; a user station interface; a video switch operable to selectively provide a video path between a one of the computer interfaces and the user station interface; and video processing circuitry configured to form a background image for a user interface and output video data representing the background image to the video switch, wherein the video switch is further operable to selectively output the video data representing the background image to the user station interface.

By providing video processing circuitry to form a background image of a user interface on a switching device, a high graphical quality and functional quality user interface can be provided without having to provide more complex graphics processing circuitry at other parts of a system. Hence, a commonly required part of the user interface is generated once and can then distributed elsewhere in the system, when required, for customisation.

The background image may include a plurality of portions, each portion representing and/or relating to and/or identifying a different respective source of video.

The video processing circuitry may be further configured to selectively receive video data from the video switch from a computer interface and/or to generate a thumbnail screen image for the computer from the received video data and/or to include the thumbnail screen image in the background image.

The video processing circuitry may be further configured to selectively receive video data from the video switch from each computer interface and/or to generate a respective thumbnail screen image for each computer from the received video data and/or to include the thumbnail screen images in the background image.

The switching device may further comprise a data switch operable to selectively provide a data path between the user station interface and a one of the computer interfaces.

The video switch may be configurable by software to vary the number of video input ports and/or video output ports.

The switching device may further comprise a network interface and include software providing a network accessible administration function.

The switching device may further comprising a plurality of user station interfaces. The video switch may be operable to selectively provide a video path between any one or a plurality of the computer interfaces and any one or a plurality of the user station interfaces.

The video switch may be further operable to selectively output the video data representing the background image to any one or a plurality of the user station interfaces.

The video switch may be operable to selectively provide a first video path between a one of the computer interfaces and a first one of the user station interfaces while also providing a second video path between the video processing circuitry and a second one of the user station interfaces.

The video processing circuitry may include a microprocessor, a video receive circuit in communication with an output port of the video switch and a video transmit circuit in communication with an input port of the video switch. The video receive circuit and/or video transmit circuit may be implemented by a programmable logic device. The programmable logic device may be an FPGA.

The video processing circuitry may be further configured to pass image data representing one or a plurality of user interface elements to the video switch for output to the user station interface.

The image data representing the or each user interface element may be compressed image data or bitmap image data.

The background image may include a frame defining a plurality of regions. Each region may be associated with a respective one of the plurality of computers.

A third aspect of the invention provides a system comprising the switching device of the second aspect, and any preferred features thereof, and one or a plurality of the user station of the first aspect, and any preferred features thereof.

The system may further comprise a plurality of computer interfacing devices. Each computer interfacing device may be in the form of a dongle.

Each computer interfacing device or dongle may include: a video interface for receiving video signals from a computer; a transceiver arranged to provide a data channel over a twisted pair; and an output interface for a cable wherein video colour data and peripheral data are passed to the output interface for transmission over the cable.

Each computer interfacing device or dongle may include: a digital video interface for receiving digital video signals from a computer; circuitry configured to measure the frequency of a digital video clock signal; a transceiver arranged to provide a data channel over a twisted pair; and an interface for a CATx cable wherein video colour data and data indicating the measured frequency of the digital video clock signal are passed to the interface for transmission over a CATx cable.

The or each user station may include circuitry configured to reconstitute and output a video signal over the output interface from video colour data received over the input interface.

The or each user station may include circuitry configured to reconstitute and output a digital video signal over the output interface from video colour data and data indicating the measured frequency of the digital video clock signal received over the input interface.

The or each user station may be connected to the switching device by a respective CATx cable and/or the or each computer interfacing device or dongle may be connected to the switching device by a respective CATx cable.

The or each cable or CATx cable may be a 4-pair twisted wire cable. The or each CATx cable may be a CAT5, 5e, 6 or 7 cable.

A fourth aspect of the invention provides a method of providing a customised user interface to a user console including a display device, the method comprising: generating a background image portion of a user interface at a switching device; transmitting video data representing the background image portion of the user interface to a user station of a user console; modifying the video data at the user station as the video data is received at the user station using video data representing a user interface element that is specific to the user station; and displaying the customised user interface on a display device attached to the user station.

The method may further comprise: transmitting the video data representing the user interface element that is specific to the user station from the switching device to the user station.

The method may further comprise: transmitting video data representing a further user interface element to the user station from the switching device to the user station; and further modifying the video data at the user station using video data representing the further user interface element.

The background image portion may include a plurality of thumbnail images of respective screens of a plurality of computers.

Generating the background image may further comprise: selectively sampling video data received from each of a plurality of computers at the switching device and storing video data representing the thumbnail image for each computer.

The background image may include a frame defining a plurality of regions. A respective thumbnail image may be provided in each respective region.

The user interface may include one or more user selectable icons and/or a pointer and/or a highlighter. The highlighter may indicate a currently connected computer. The one or more user selectable icons may be usable to control operation of, or a mode of operation of, the switching device.

The user interface may include one or more greyed out regions and/or one or more blacked out regions and/or one transparent regions corresponding to a currently pointed to computer.

The method may further comprise: converting a video signal into video colour data at a dongle connected to a video output of a computer; transmitting the video colour data from the dongle to the switching device; transmitting the video colour data from the switching device to the user station; and reconstituting and outputting the video signal at the user station from the video colour data.

The method may further comprise: converting a digital video signal into video colour data and data indicating a measured digital video clock frequency at a dongle connected to a digital video output of a computer; transmitting the video colour data and data indicating the measured digital video clock frequency from the dongle to the switching device; transmitting the video colour data and data indicating the measured digital video clock frequency from the switching device to the user station; and reconstituting and outputting the digital video signal at the user station from the video colour data and data indicating the measured digital video clock frequency.

An embodiment of the invention will now be described in detail, and by way of example only, and with reference to the accompanying drawings, in which:

FIG. 8 shows a mask display element;

FIG. 9 shows a highlighter display element;

FIG. 10 shows an icon display element;

FIG. 11 shows a pointer display element;

Similar items in the different Figures share common reference signs unless indicated otherwise.

An embodiment of the invention will be described below within the specific context of a KVM switching system. However, it will be appreciated that the invention is not necessarily limited to its application in such systems and that it may be applied in other systems and devices also, in which it is desirable to be able to provide individualised, high quality graphics display to multiple users.

Figure 1:
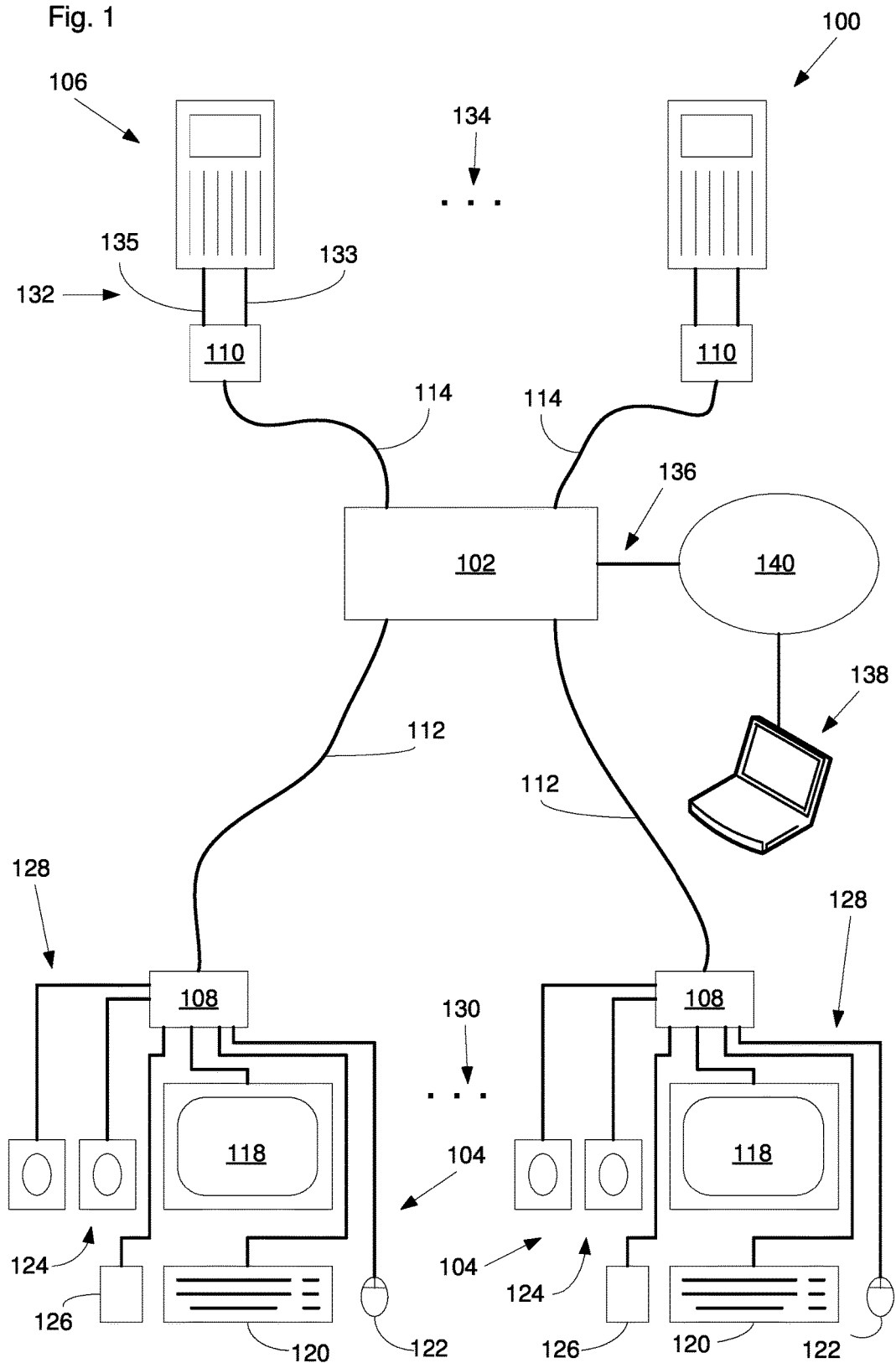
FIG. 1 shows a schematic block diagram of a system according to the invention and including one or more devices, and/or combinations of devices, according to the invention.

With reference to FIG. 1 there is shown a system 100 according to an aspect of the invention, and in particular a KVM system. The KVM system 100 includes a KVM switch 102 according to an aspect of the invention. In particular the KVM switch 102 is a digital video CATx KVM matrix switch. The central CATx matrix switch 102 can connect any one of user consoles 104 to any one of computers 106 via respective user stations 108, computer interfacing devices or dongles 110 and network style 4 twisted wire pair CATx cables 112, 114 (where, for example, x=5, 5 e, 6, 7). Using existing video extension technologies, such as those implemented by the AdderLink X-DVI PRO available from Adder Technology Ltd., cables 114 can be 10 m long and cables 112 can be 50 m long. These extension distances enable neat mounting of the computers 106 and enable the user stations 108 to be located at some distance from the central switch 102.

Each of the plurality of user consoles 104 may include a video display device 118, which may be a touch screen enabled video display device, a keyboard 120, mouse 122 and a pair of speakers 124. Additional USB devices 126, such as a card reader or USB touch screen, may also form part of the set of peripherals that make up a user console 104. The user station 108 is connected to the peripherals via native style cables 128. Although two user consoles 104 are illustrated in FIG. 1 it will be appreciated that a greater number may also be provided as indicated by ellipsis 130.

Each of the plurality of computers 106 is connected to a respective dongle 110 via short cables 132 that form part of the dongle for convenience and neatness. A first 133 one of cables 132 may be a digital video cable which connects to the video output connector of the computer and others 135 of the cables 132 may connect to keyboard and mouse connectors and connectors for other peripheral input/output devices, such as audio output connectors. Although two computers 106 are illustrated in FIG. 1 it will be appreciated that a greater number may also be provided as indicated by ellipsis 134.

The central KVM switch 102 has multiple 8P8C (eight position, eight contact) network-style jacks or sockets for attaching respective plugs of the CATx cables 112, 114. For example, the KVM switch 102 may have 30 ports as this can be constructed using an array of 32-port Mindspeed M21163 cross-point switches and covers popular configurations for this type of KVM switch, such as 8 users by 16 computers or 10 users by 20 computers.

Some applications may require multiple video displays 118 per user console 104. In this case, multiple user stations 108 may be used for each user console 104 and multiple dongles 110 may be used for each computer connection.

The central KVM switch 102 may also have an Ethernet network port 136 so that the KVM switch 102 may deliver web pages to a configuration computer 138 over a local or wide area network 140. The technology and electronics for providing web or internet interfaces of this type is ubiquitous and generally known to a person of ordinary skill in the art. Using the provided network interface, an administrator can configure the KVM switch 102, for example to setup descriptive names for each of the computers 106 that will appear on an on-screen computer selection menu. The administrator can also setup access rights that restrict computer access from certain user stations. Hotkey trigger sequences and various other KVM switch configuration options can also be setup via the network interface.

The red, green and blue elements of the digital video signal are transmitted over three twisted wire pairs of the CATx four-pair cables 114, 112. The fourth twisted wire pair is used to carry USB data, audio data and other management data that generally enables microprocessor circuits within the user stations 108, central switch 102 and dongles 110 to communicate and co-operate together as described in greater detail below.

Figure 2:
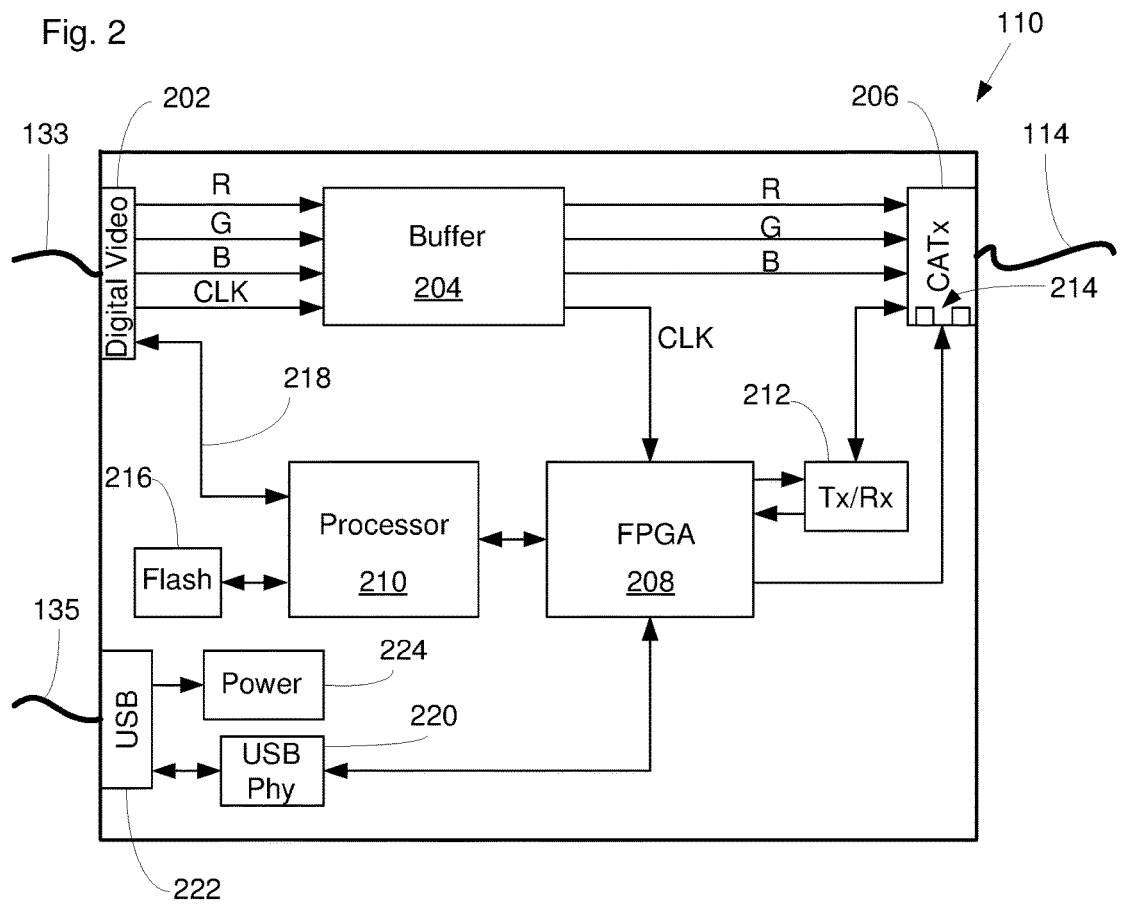
FIG. 2 shows a schematic block diagram of a computer interfacing device or dongle part of the system of FIG. 1.

FIG. 2 shows a schematic block diagram of the dongle 110 of the system 100. The dongle 110 corresponds generally to the transmitter part of the system as described in UK patent application publication number GB-A-2489724. Its general operation is briefly described herein to aid understanding of how the dongle 110 fits within the overall system 100. A digital video interface 202 receives red, green and blue TMDS video signals at speeds up to 1.65 Gb/s together with a TMDS clock signal. These are passed to a buffer circuit 204 that may be implemented using a Maxim MAX3814. The red, green and blue signals are then passed to a CATx cable interface 206 for transmission over three pairs of the four twisted pair cable 114. The clock signal is passed to an FPGA 208 which includes circuitry to measure the clock frequency and pass this on to a microprocessor 210. The FPGA 208 also includes circuitry which implements a 40 mega-baud, half duplex signalling protocol to signal data in each direction at an aggregate rate of around 15 Mb/s along the fourth pair of the twisted pair cable 114. A transceiver circuit 212 ensures that the cable 114 is driven with suitable low voltage differential signalling ("LVDS") signals. Using the transceiver 212, the microprocessor 210 can send and receive data across the CATx cable 114. The dongle 110 uses this data link to communicate the measured video clock frequency to the central KVM switch 102, which is then able to forward this on to the user stations 108. The measured pixel clock frequency is used by circuitry within both the central KVM switch and the user stations.

A suitable device for FPGA 208 is a Xilinx Spartan 6, a suitable device for transceiver 212 is a Texas Instruments SN65MLVD200A and a suitable device for microprocessor 210 is an LPC1774FBD144 provided by NXP Semiconductors. The FPGA 208 also drive LEDs 214 within the CATx connector 206 to indicate that data is being transferred and/or a link has been made.

The microprocessor 210 is supported by flash memory 216 and is connected to the digital video interface 202 via an i2c link 218 to provide EDID data to the computer over a Display Data Channel link. The digital video interface 202 may be configured to receive various different digital video signal standards, such as DVI, HDMI or DisplayPort (++), and different dongle types may be provided with suitable DVI, HDMI or DisplayPort connectors to enable a wide range of different digital video sources to be supported.

Circuitry within the FPGA 208 also implements a serial interface engine that enables the microprocessor 210 to communicate with the computer's USB port via a USB PHY circuit 220 and USB interface 222. The microprocessor 210 is able to emulate the presence of a keyboard, mouse, audio device and, optionally, other devices such as a USB card reader or USB touch screen, to the computer. When keyboard or mouse data is received over the cable 135 the microprocessor 210 is able to signal the appropriate keyboard or mouse actions back to the computer over the USB cable 135 to emulate the presence of a keyboard and mouse. A suitable device for USB PHY 220 is the TUSB1105RGT provided by Texas Instruments. The dongle 110 is powered from the USB interface 222 via power circuitry 224. As only a single USB interface 222 is present, the keyboard and mouse are presented as a combined keyboard/mouse USB device. The FPGA 208 may also include USB hub circuitry to enable the microprocessor 210 to support further optional USB devices.

Figure 3:
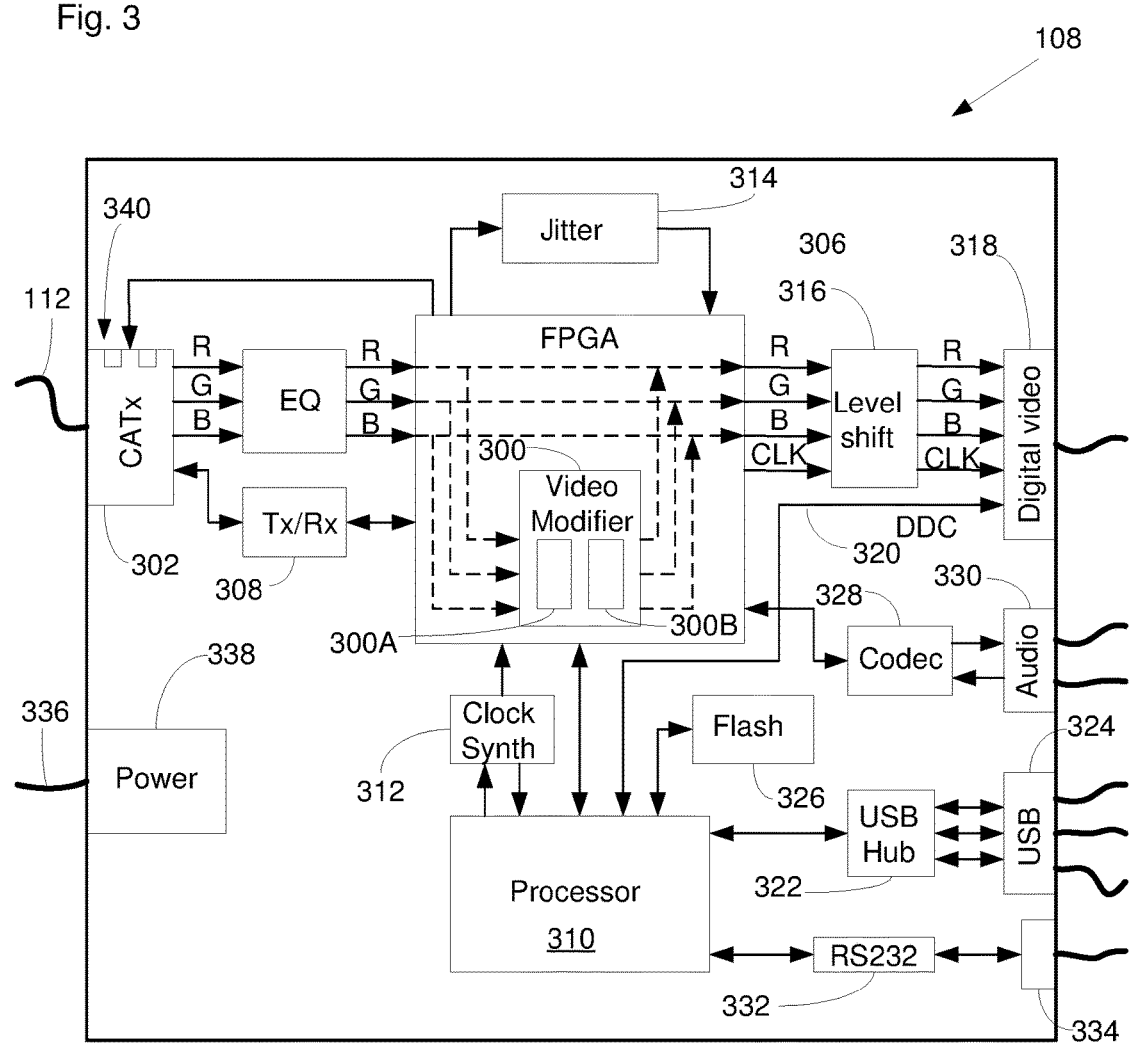
FIG. 3 shows a schematic block diagram of a user station part of the system of FIG. 1.

FIG. 3 shows a schematic block diagram of a user station 108 according to the invention and being part of the system 100. Some parts of the user station 108 correspond to a part of a receiver part of the system described in UK patent application publication number GB-A-2489724 which, in particular, describes a method by which digital video can be transmitted over a CATx wire using three pairs of a four-pair twisted-pair cable. Generally, this involves measuring the clock signal at a transmitter-end, transferring clock measurement data along with the colour signals over the CATx cable, receiving the colour signals and the clock measurement data and then recovering the clock signal at the receiver-end from the colour data and the clock measurement data.

However, for the present invention, the more important feature of the user station 108 is a video modifier circuit 300 which implements an element of the hybrid on-screen display ("OSD") which the invention realises.

The CATx cable 112 supplies red, green and blue video signals to a CATx 8P8C style input connector 302 over the first three twisted pairs. Input connector 302 provides or is part of an input interface. These colour signals are fed into an equaliser circuit 304 to compensate for signal loss over the cable 112 and are then supplied to an FPGA 306. FPGA 306 provides a video processing device.

The CATx cable 112 also carries a bi-directional LVDS data signal over the fourth twisted wire pair. This data signal is driven by transceiver 308. FPGA 306 includes circuitry (not shown) to support the half duplex signalling protocol that operates at a line signalling speed of 40 mega-baud to deliver data in both directions at an aggregate rate of approximately 15 Mb/s. Using the FPGA signalling circuitry and the transceiver 308, a microprocessor 310 can communicate with the central KVM switch 102 and receive the measurement of the clock frequency of the incoming video signal.

The microprocessor 310, a clock synthesizer circuit 312, a jitter reduction circuit 314 and circuitry (not shown) within the FPGA 306 co-operate together to recover the clock signal using the equalised colour signals and the transmitted clock frequency measurement data. The details of this method are described in detail in UK patent application publication number GB-A-2489724.

A level shifting circuit 316 is used to drive the digital video signal out to a digital video interface 318, which, for example, may be a DVI interface. Digital video interface 318 provides an output interface. The microprocessor 310 is able to communicate with the user console display 118 over a Display Data Channel connection 320 and thus co-operate with the central KVM switch 102 to ensure that appropriate display EDID information is provided to any currently connected dongle 110.

The microprocessor 310 is connected to the user console's USB keyboard 120 and mouse 122 by a USB hub 322 and USB sockets 324 and is supported by flash memory 326. Software running on the microprocessor 310 emulates the presence of a computer to the USB keyboard 120 and mouse 122 and is able to interpret keyboard keystroke data and mouse data and also forward this data onto the central KVM switch 102 via the data link. Optionally, the software may also be configured to emulate the presence of a computer to other USB devices which may be attached to the USB sockets 324, such as card readers and touch screens.

The central switch 102 in turn passes the keyboard, mouse and other data onto a currently connected computer 106 via its dongle 110. Audio data representing audio samples may also be sent over the data link and, when present, the audio data is communicated to an audio codec 328 via circuitry within the FPGA 306 to enable the system to support speakers 124 and microphones which may be connected to audio sockets 330. An RS232 circuit 332 provides an RS232 link between an RS232 connector 334 and the microprocessor 310 for maintenance and upgrade purposes. The user station 108 is powered by a 12V power feed 336 from a power supply to a power circuit 338. The FPGA 306 also controls link and activity LEDs 340 on the CATx connector 302.

Suitable devices to implement the various elements of the circuit previously described are as follows. In each case, the main component may use a number of support components as detailed in the respective manufacturer data sheets: a suitable device for transceiver 308 is a Texas Instruments SN65MLVD200A; a suitable device for equalizer 304 is a Maxim MAX3815; a suitable device for microprocessor 310 is a LPC4078FBD144 as provided by NXP; a suitable device for FPGA 306 is a Lattice ECP2M20 series FPGA; a suitable device for level shift 316 is a Texas Instruments SN75DP139; a suitable device for jitter reducer 314 is a NB4N507A as provided by ON Semiconductor; and a suitable device for clock synthesizer 312 is a Texas Instruments CDCEL925.

Figure 4:
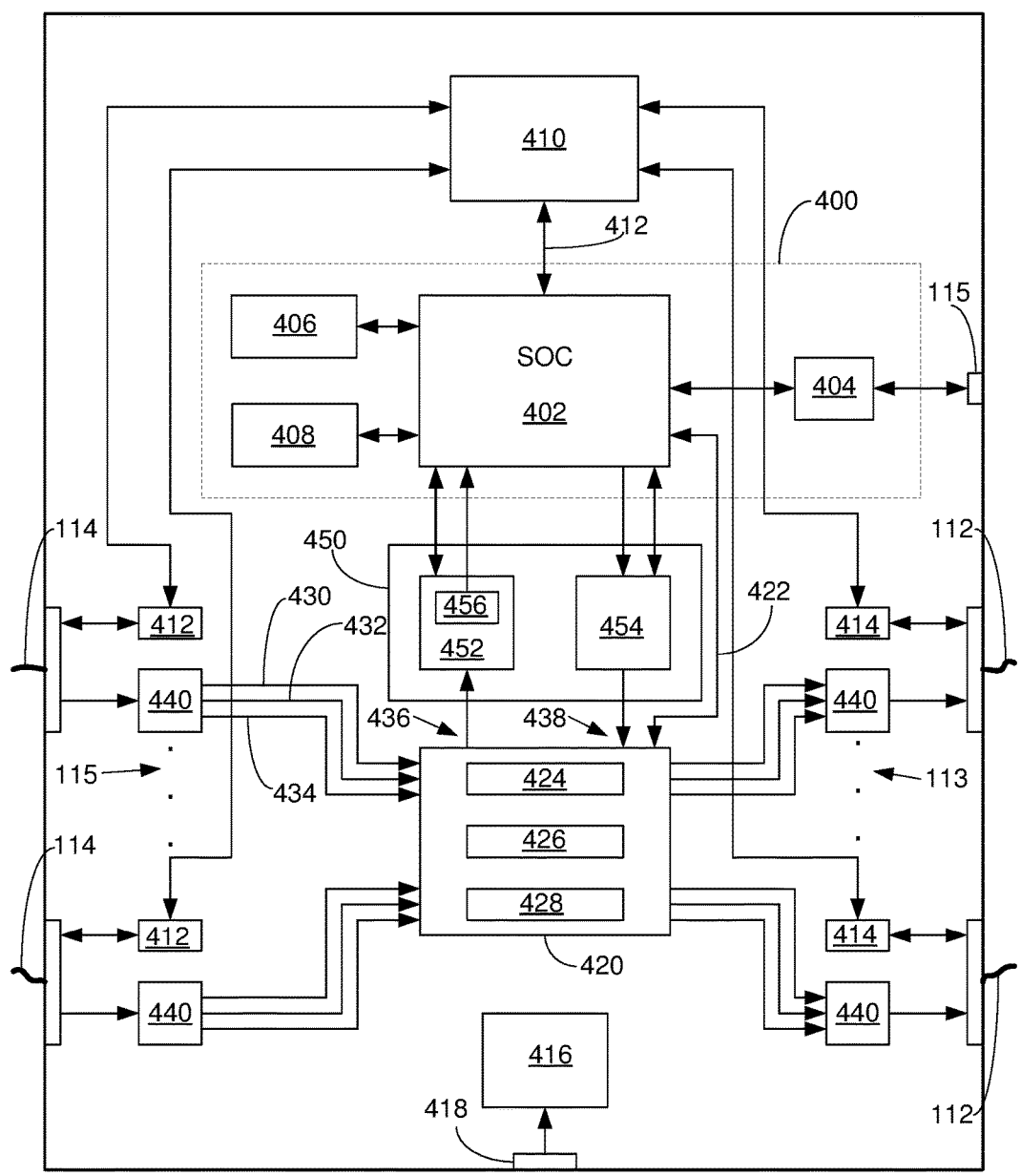
FIG. 4 shows a schematic block diagram of a switch according to the invention and being part of the system of FIG. 1.

FIG. 4 shows a schematic block diagram of the central KVM switch 102 of the invention and that handles the data and video routing between the dongles 110 and the user stations 108. In general the video signals are carried down the first three twisted wire pairs of the four twisted pair CATx cables and the data signals are carried down the fourth twisted wire pair. The data representing the video clock frequency measurements is carried down the fourth data pair together with other data. KVM switch 102 includes two computer interfaces and two user station interfaces, but may include a greater, or lesser, number of each as indicated by ellipsis 115 and 113.

With reference to FIG. 4, the KVM switch 102 includes a microprocessor system 400 including a performant system-on-chip microprocessor device 402 and a Gigabit PHY 404 to enable Ethernet network communication over port 115. A suitable system-on-chip microprocessor is an i.MX6 series processor as available from Freescale Semiconductor, Inc. Such a device is generally performant, able to run an embedded Linux operating system, able to capture digital video on its camera sensor interface, able to output video on its HDMI interface and able to generate the high quality HD graphics required for the common screen image portion of the hybrid OSD. The processor 402 is supported by DDR3 memory 406 and flash program memory 408 in a conventional arrangement.

A data FPGA 410 is programmed to implement multiple 40 mega-baud half-duplex signalling engines. The data FPGA 410 is configured so that the microprocessor system 400 can send and receive data over any of the CATx cables by reading and writing data buffers within the FPGA over an interface 412. Data FPGA 410 hence provides or is part of a data switch. The implementation of such signalling engines in FPGAs is generally known in the art and the exact protocol used is not essential to the operation of the invention. A suitable component for the data FPGA 410 is the XC6SLX45T Spartan 6 FPGA as provided by Xilinx Inc.

In order to reliably signal over the CATx cables 112, 114, the data FPGA 410 is coupled to multiple LVDS transceiver circuits 412, 414 that connect to the fourth twisted pair of the CATx cables. The LVDS transceiver circuits 412, 414 may be realised using Texas Instruments SN65MLVD200A transceivers and various supporting resistors to match the transmission line characteristics of the twisted pair cable.

The software running on the microprocessor system 400 routes the keyboard, mouse, audio, EDID, video frequency measurement, mask image, pointer image, icon image, highlighter image, upgrade and general system management data according to the current state of the KVM switch. For example, the microprocessor system 400 may determine that a particular user-station is controlling a particular computer and signal the data FPGA 410 to route keyboard and mouse data received from the user station to the dongle that is connected to the target computer. At the same time, information arriving from the dongle, such as keyboard LED update messages may be routed to the user station. The microprocessor system 400 may also generate its own data. For example it may determine from its configuration that it needs to program the dongles with certain EDID information to tell the computers that the system supports a particular set of video resolutions. Furthermore, the system 400 is arranged so that the flash program memory on all the connected dongles 104 and user stations 103 may be upgraded from the microprocessor system 400 by sending data over the CATx cables. This means that an administrator can upgrade and manage the entire system 100 from the remote configuration computer 138. The processing capability of the microprocessor system 400, coupled with the data routing capability of the data FPGA 410 coupled with the user station 108 and dongle 110 is capable of implementing the functionality typically required of a matrix KVM switch system.

In one embodiment, 30 interface ports may be provided on the central KVM switch 102 as this number fulfils the majority of mid-sized requirements for this type of switch whilst using a single layer of Mindspeed M21163 32-port cross-point switches. This construction enables 10 user connections and 20 computer connections to be supported. However, as the user station and dongle connections at the KVM switch 102 can have the same electronic interfaces it is also possible to change the configuration of the KVM switch 102 in software to support other configurations such as 20 user station connections and 10 dongle connections. The Mindspeed M21163 cross-point switches have 8 fixed output ports and 24 configurable in/out ports so when using such cross-point switches the KVM switch configuration may have a minimum of 7 user station connections, with the eighth output port reserved for routing video data to the microprocessor system 400 to provide the video information used to generate respective thumbnail images of the incoming video streams.

A power circuit 416 is also provided and receives a 12V power signal from an external power supply via a power connector 418. Power circuit 416 supplies power to all the components of the KVM switch at the various required voltage levels.

The remainder of the KVM switch relates principally to video routing and the generation of a common display screen which can be used for computer selection. A video cross-point switch 420 switches multiple input video streams to multiple output video streams under the control of the microprocessor system 400 via link 422. Hence cross point switch 420 provides or is part of a video switch. As discussed above, the video cross-point switch 420 may be constructed using three Mindspeed M21163 32-port cross-point switches, one each for the red 424, green 426 and blue 428 video signals, e.g. 430, 432, 434. These switches 424, 426, 428 are arranged to operate in synchrony by being fed with the same control signals. The overall effect is to create a 3-channel 32-port cross-point matrix. The Mindspeed M21163 switches are very flexible and capable of broadcasting one input channel to any number of output channels. Furthermore, 24 of the ports can be configured in software to be either inputs or outputs. This means that the microprocessor system 400 can, within these constraints, determine the i/o port allocation of the video cross-point switch 420 using software.

In a typical configuration, the 32-port video cross-point switch 420 may be configured to support 10 video outputs to user stations and 20 video inputs from dongles with one port 436 being dedicated to delivering video data to the microprocessor system 400 and one port 438 being dedicated to receiving video data from the microprocessor system 400. Ports on the video cross-point switch 420 are AC coupled to the three video pairs of the CATx cables using coupling circuits 440. The video signals received and transmitted on the CATx cables are TMDS.

A video FPGA 450 includes a video receiver circuit 452 which receives serialised RGB video data from the video switch 450. The receiver circuit 452 includes many of the video elements of the user station circuit 108, but omitting the video modifier element 300. It may be implemented using the same Lattice ECP2M20 series FPGA, ON Semiconductor NB4N507A jitter reduction chip and Texas Instruments CDCEL925 clock synthesizer and operates in a very similar manner. However in this case, the function of the microprocessor 310 is provided by the system-on-chip device microprocessor circuit 402. The video FPGA is shared with a transmit circuit 454. The receive circuit 452 also includes an additional functional block 456 providing a colour space converter and which is arranged to converts RGB format video data into the YCbCr format used by the SoC's camera sensor input. Such conversion blocks are generally well known in the art, as generally is their implementation in FPGAs.

The video transmit circuit 454 receives video data from a HDMI port of the SoC 402. The video transmit circuit 455 includes many of the video related elements of the dongle 110, such as those used to measure the clock frequency of the transmitted video signal. The FPGA function 208 of the dongle is implemented using the video FPGA 450 shared with the receive circuit 452. The function of the microprocessor 210 of the dongle 110 is provided by the system-on-chip device 402.

The microprocessor system 400 operates the video crosspoint switch 420 to switch the input from each video source (i.e. the video output from each computer 106) to the receive circuit 452. The SoC 402 then captures the video from each video source using its camera sensor input and loads the pixel data into memory 406. At any one time, the microprocessor system 400 is therefore storing images from a selected one of the video sources that are currently connected to the switch and transmitting video. The system-on-chip microprocessor 402 has rich graphics capabilities and scales these images, e.g. into thumbnail images, and presents the scaled images as part of a common image that is output on an HDMI interface to the transmit circuit 454. Hence processor 402 and FPGA 450 provide video processing circuitry to generate the common background image of the user interface to be displayed at the user consoles.

The software running on the microprocessor system 400 configures the common display image or back ground image to be appropriate for the number of video sources in use. For example, the common frame image shown in FIG. 6 would be appropriate to control up to 8 different video sources. If a larger number of computers need to be supported then the rectangles representing each computer vide output are made smaller. The maximum number of video sources supported may be 23 arranged in four rows of five and one row of three.

Figure 5:
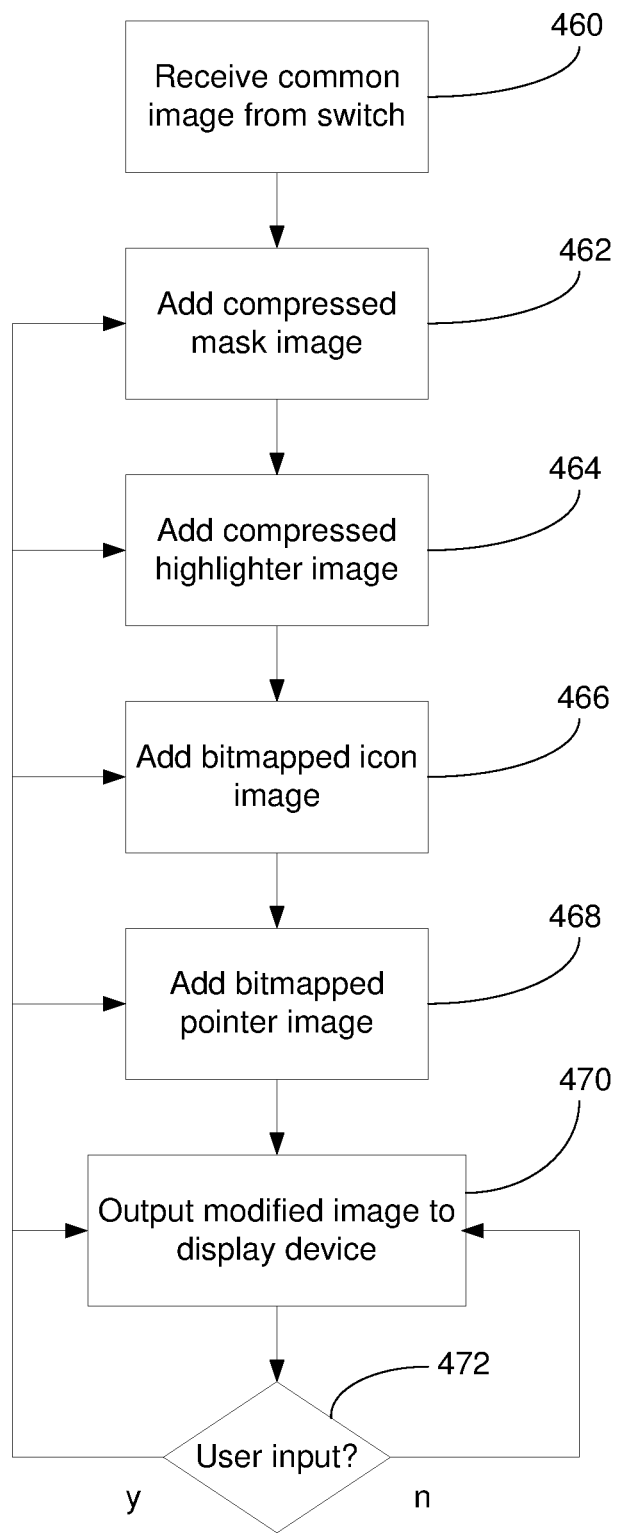
FIG. 5 shows a flow chart illustrating a method of graphics processing performed by the user station shown in FIG. 3.

FIG. 5 shows a flow chart illustrating operations carried out by the user station 108 as part of a method to generate and output the user specific hybrid OSD providing a computer selection. The computer selection menu generated by the invention is not a traditional on-screen display (OSD) in the sense that it is not overlaid or inserted onto a computer's existing video stream. In contrast, it is essentially an alternate video source to the computer video source and that is dedicated to the computer selection function. In effect activating the computer selection screen is equivalent to switching to a dedicated control computer rather than one of the attached computers 106. It may be described as a hybrid OSD because the display composed of different image elements that are implemented by different parts of the system 100. To ensure the widest compatibility with modern HD displays, the computer selection screen is generated at a resolution of 1920 pixels wide, 1080 pixels high and with a refresh rate of 60 Hz.

The computer selection menu is a hybrid OSD that consists of two key elements: a common screen image and user station specific image elements. The common screen image is generated within the central KVM switch 102 and is common to all the computer selection screens output by the individual user stations. A video modifier function is implemented within each user station to modify the common screen image from the central switch to be specific to each user console. The screen modifier function includes several sub-functions that can be independently controlled. These include the ability to overlay a cursor; the ability to mask (blank out) areas of the screen; the ability to dim (grey out) areas of the screen; the ability to generate a highlighter and the ability to overlay one or more simple icons. These functions are sufficiently simplistic to be performed on-the-fly by each user station 108 and without the need of a frame store. Consequently the circuitry required to implement them is simpler and more cost effective.

When a user at a user console 104 wishes to switch computer using the computer selection menu, they press the appropriate hotkey sequence on the keyboard 120. This is detected by the user station microprocessor circuit 310 which then requests the central KVM switch 102 to output the common screen image to the user station instead of the video from the computer that is currently being viewed. Hence, at 460, the user station receives the common screen image from the KVM switch. The user station modifies 462, 464, 466, 468 the common screen image as it passes through the user station's FPGA, to be customised to the individual user station, before the customised computer selection menu is output to the display device 118 of the user console at 470.

The central KVM switch signals the modifications that need to be applied to the common image over the CATx link cable to the user station 108. These modifications may include blanking areas of the screen, dimming areas of the screen, highlighting an area of the screen, inserting a cursor and inserting certain icons. In order to dim or blank areas of the screen, the central KVM switch provides a compressed image mask to the user station. The compressed image masks is specific to the user station.

Figure 6:
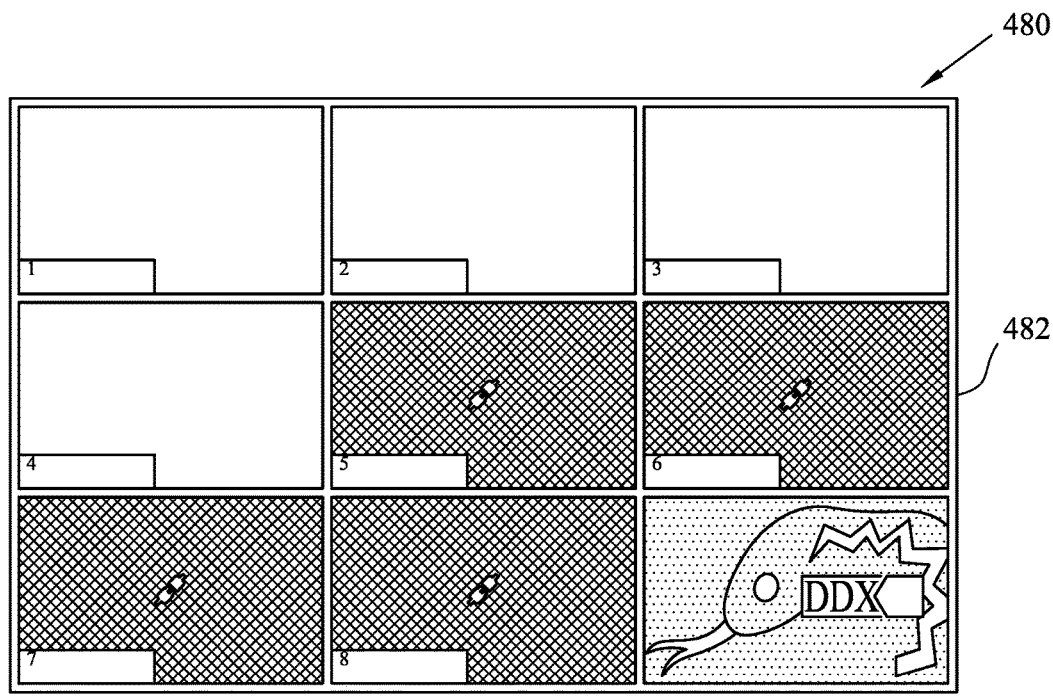
FIG. 6 shows a common screen frame image generated by the switch.
Figure 7:
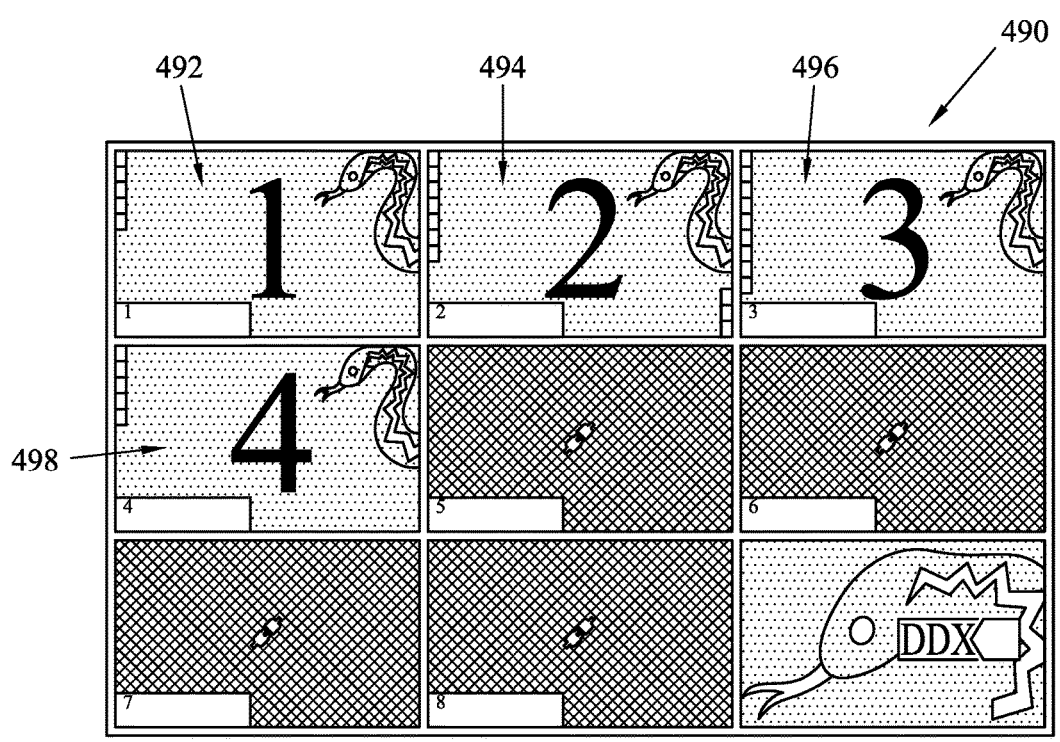
FIG. 7 shows a common combined screen frame and screen thumb nails image generated by the switch.

Referring to FIG. 6, the microprocessor system creates the frame image 480 depending on the maximum number of video sources that can be connected and which is configured by the administrator, which in this example is eight. As also illustrated in FIG. 6, only four video sources are currently detected as being connected to the KVM switch, and hence the remaining four out of the possible eight frames have graphical elements 482 showing a disconnected state. As explained above, captured screen thumbnails 492, 494, 496, 498 held in memory 406 are then added to the frame image 480 to create the common image 490 for the computer selection screen that is output to the video cross-point switch 420. This common image, which may be thought of as a common background image, is sent by the KVM switch to, and received by 460, the user station.

The common video image is then modified by the video modifier function 300 within the user station's FPGA 306 to create an individualised computer selection menu that is suitable for the individual user station and reflects the access rights and current connection status of that user.

This process is achieved by successively applying a series of image modifier sub-functions that may include, as appropriate, applying 462 an image mask 500 to create a masked image, applying 464 a highlighter image 510 to create a masked and highlighted image, applying 466 an icon image 520 to create a masked and highlighted image with icons, and finally applying 468 a pointer image 530 to create a masked and highlighted image with icons and pointer 540 which is then output 470 on the user console display device 118.

The user station is sent a compressed image mask 500 by the central switch which is used to mask out areas of the selection screen which may not be available to that user station, e.g. black out element 502, and to reduce the visibility of non-selected video sources, e.g. greyed out elements 504, 506. Image mask 500 includes a transparent element 508 corresponding to the thumbnail screen image 494 of the computer to which the user station is currently pointing with the cursor. Application of the image mask to the common image 490 is performed at 462 by using alpha-blending as described in greater detail below.

A compressed highlighter image 510 is also provided by the KVM switch and which can be positioned on the console display screen 118 in response to user mouse and keyboard input to highlight a specific video source. Application of the highlighter image 510 is performed at 464 by the video modifier 300. The allowable positions of the highlighter rectangle 510 are constrained by a list of allowable positions, e.g., positions corresponding to 492, 494 and 496, provided to the user station 108 by the KVM switch 102.

To enable the user to perform selection actions, e.g. select a video source for full-screen viewing, an icon image 520 is provided by the KVM switch 102 to the user station 108 and which is added as a bitmapped icon image at 466.

To provide user screen positional feedback, an on-screen pointer image 530 is also provided by the KVM switch 102 to the user station 108 which is added as a bitmapped pointer image at 468.

Figure 12:
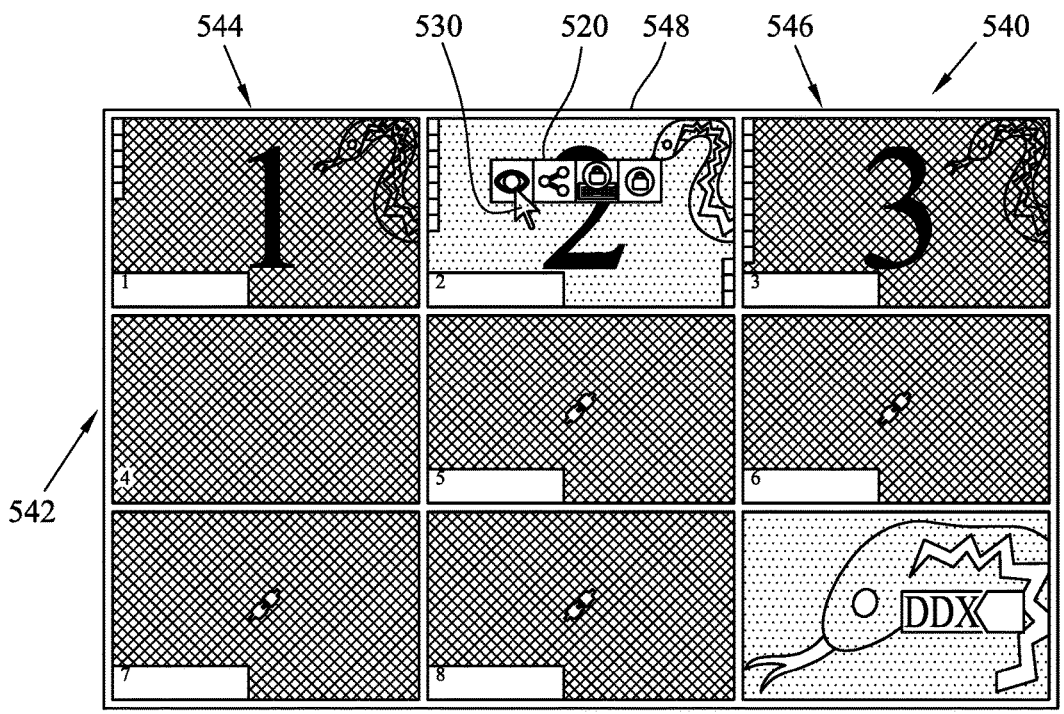
FIG. 12 shows a first embodiment of an individualised selection menu output by a user station and displayed by a display device of a user console.

The complete Hybrid OSD image 540 output to the user console display screen 118 is illustrated in FIG. 12. In the example shown in FIG. 12, the user station does not have access rights to computer four, so element 502 of the image mask 500 has blanked the thumbnail image 498 for the screen of computer four 542. If the user moves the cursor across this box, no connection icons will be displayed. Similarly the user is not currently connected to the first or third computers and so their screen thumbnails 544, 546 are greyed out. The user is about to select video only mode for the second computer on port two, so the port 2 box has the highlighter rectangle 548 added around it and the connection icons 520 have been added. As noted above, although the current user station has access rights for computers one and three, the image mask 500 has dimmed the video pictures for these computers to bring computer two's video more into user focus.

It will be appreciated that FIG. 12 shows an example of the hybrid OSD in action but that the software running on the central switch's microprocessor system 400 together with software running on the individual user station microprocessors 310, is able to amend the visual appearance of the computer selection menu to be specific to each individual user station. Using this system, the individual user station computer selection menus can be tailored to suit each individual user station.

Whilst the computer selection menu is being output 470, the user station interprets user mouse movements 472 and paints a pointer 530 on the computer selection menu 540. The pointer is provided by the central KVM switch as a bitmap pointer image with its position on the screen being determined by the user station. Mouse button press events are reported to the central KVM switch which can then detect if a user has selected a computer to switch to.

Figure 13:
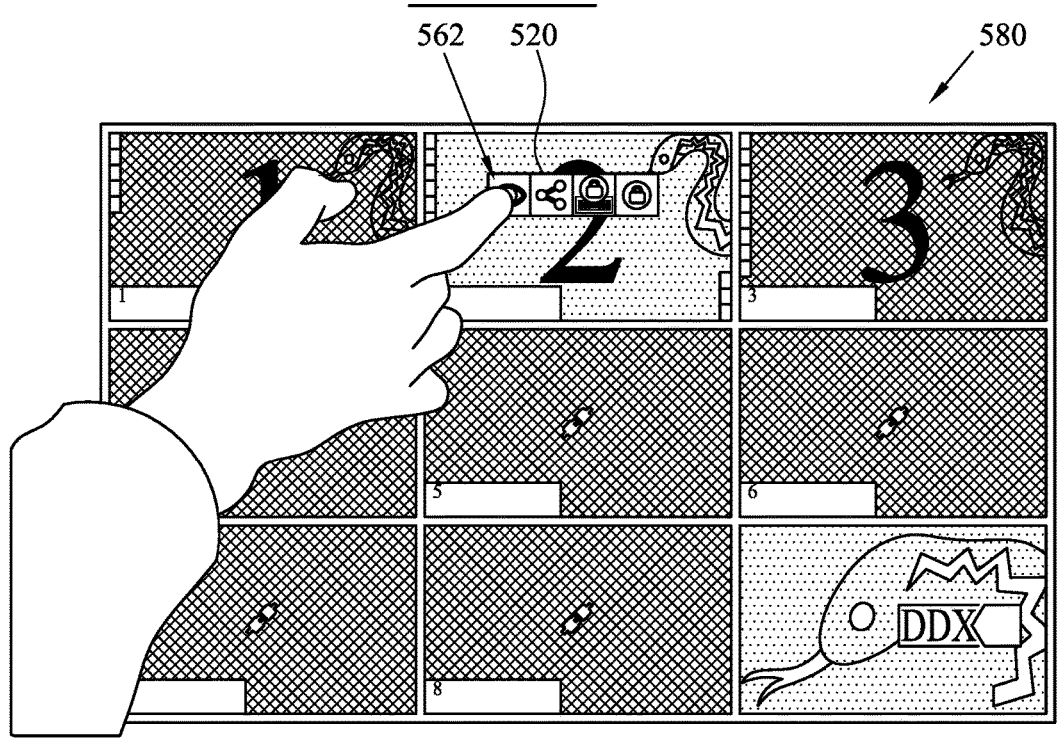
FIG. 13 shows a second embodiment of an individualised selection menu output by a user station and displayed by a touch screen display device of a user console.

In another embodiment, a touch screen display device may be used for user console display device 118 additionally or alternatively to a mouse. Hence, pointer 530 and pointer image addition step 468 may be omitted. As illustrated in FIG. 13, the pointer image 530 may be omitted from the computer selection menu 560 displayed if a touch screen is being used instead of a mouse, and instead user touch events, e.g. 562, are reported to the central switch which can be used to select a computer.

Whilst the computer selection menu is being output, the user station interprets user mouse movements 472 and signals to the KVM switch when the cursor 530 is in a particular computer selection box. The KVM switch then provides an appropriate icon image 520 for the user station to display within the computer selection box. This icon image 520 contains icons for four possible selection modes: video only 522, shared access 524, exclusive mode 526 and private mode 528. When the user station's cursor 530 points to one of the icons, the user station signals the central KVM switch and the switch updates the icon image. In this way, the icons can change colour as the user station's mouse points to them. If the particular user station does not have access rights to a particular access mode then the central switch greys out that icon. The icons are provided by the central KVM switch as an icon image 520 with its position on the screen being determined by the user station. Mouse button press events are reported to the central KVM switch which can then detect if a user has selected a particular access mode.

Also, whilst the computer selection menu is being output, the user station can paint the selection highlighter 510 on the computer selection menu. This is useful if the user is using the keyboard 120 to navigate the computer selection menu. The selection highlighter 510 is provided by the central KVM switch as a compressed highlighter image with its position on the screen being decided by the user station. Relevant keyboard events 472 (e.g. enter key press) are reported to the KVM switch which can then detect if a user has selected a computer to switch to. In order for the user station to calculate valid positions for the selection highlighter the central KVM switch provides each user station with a list of valid positions.

The mask image 500, pointer image 530, icon image 520 and highlighter image 510 have a number of common features.

They each include an alpha channel to support greying out areas of the computer selection menu with the text showing through and also to support anti-aliasing.

They each support up to 16 simultaneous colours from a palette of 2^24 colours.

The mask image 500 and highlighter image 510 are provided to the user station 108 in a compressed form. For example, a 1080p mask image 500 may use merely around 50 kbits of memory. The pointer image 530 and icon image 520 are not provided to the user station in a compressed form, instead they are provided as four bit bitmapped images.

All the image types, both compressed and bitmapped, use a common format for storing their 16 colours. Each colour is stored as a 32 bit value in ARGB format. Where Alpha (A) is the MSB and Blue (B) is the LSB. Red (R), Green (G), and Blue (B) take unsigned values in the range of 0 to 255. Alpha takes unsigned values in the range 0 to 128, where 128 is fully opaque and 0 is fully transparent.

The 16 colours are stored as a 64 byte array Ac0, Rc0, Gc0, Bc0, Ac1, Rc1, Gc1, Bc1, Ac2, . . . , Bc14, Ac15, Rc15, Gc15, Bc15 where Ac0, Rc0, Gc0, Bc0 is colour 0 and Ac15, Rc15, Gc15, Bc15 is colour 15. Ac0 is stored at the lowest address and Bc15 at the highest address. This array is the image colour map.

The image colour Ac, Rc, Gc, Bc is displayed on background colour Rb, Gb, Bb as the display colour Rd, Gd, Bd where:

$$Rd=(Ac*Rc+(128-Ac)*Rb)/128$$

$$Gd=(Ac*Gc+(128-Ac)*Gb)/128$$

$$Bd=(Ac*Bc+(128-Ac)*Bb)/128$$

Rb, Gb, Bb, Rd, Gd, and Bd are unsigned values in the range from 0 to 255. The arithmetic for Rd, Gd, Bd is integer arithmetic with full bit growth for intermediate values. The division to get the final 8 bit answer includes a rounding operation.

The compressed image format for the mask image 500 and the highlighter image 510 takes advantage of the lack of detail in the mask image 500 and the highlighter image 510. For each image there are only a limited number of different rows, and within each row there are only a limited number of changes in pixel colour as the row is viewed as a progression from left to right.

The compressed format image consists of three arrays: an image row selector, which maps image row number to a row descriptor; an image row descriptor table which maps the row descriptor number to a description of the sequence of 4 bit pixels in a row; and an image colour map, as previously described, which maps the 4 bit pixels to ARGB values. Compression techniques of this nature are generally known in the art and the exact compression technique is not essential to the operation of the invention.

The bitmapped format, for the icon image 520 and pointer image 530, consists of an array of unsigned 4 bit pixels, where the pixel value selects which of the 16 colours to display, with a pixel value of u selecting colour u from the image colour map. The pixels for a n row by m column bitmap are stored as an array in the order P00, P10, P20, . . . , Pm−1 0, P01, P11, P21, . . . , Pm−1 n−2, P0 n−1, P1 n−1 P2 n−1, . . . , Pm−1 n−1. P00, P10, are at the lowest byte address with P00 stored in the lower nibble and P10 in the upper nibble. Pm−2 n−1, Pm−1 n−1, are at the highest byte address with Pm−2 n−1 stored in the lower nibble and Pm−1 n−1 in the upper nibble. P00 is the top left of the bitmap, Pm−1 0 is the top right, P0 n−1 is the bottom left, and Pm−1 n−1 is the bottom right. This array is the image bitmap.

The video modifier block 300 implements the modifications to the common image corresponding to steps 462, 464, 466 and 468 in FIG. 5. Video modifier block 300 includes first functionality 300A which implements the compressed image modifier sub-functions corresponding to steps 462 and 464 and second functionality which implements the bitmap image modifier sub-functions corresponding to steps 466 and 468. These sub-functions are cascaded such that the output from 462 is connected to the input of 464, and likewise until the output from 468 becomes the screen modifier function output. Image data flows from the lowest sub-function input 462 to the highest sub-function output 468, such that each sub-function can add image sub-elements to the final hybrid OSD image. These image sub-elements are alpha-blended into the image from the previous sub-function. Higher sub-functions have priority over lower sub-functions, such that non-transparent OSD image sub-elements can occlude the image from the lower sub-functions. The microprocessor 310 within the user station 108 controls the operation of the video modifier function 300 by writing into registers and memory within the FPGA 306.

Figure 14:
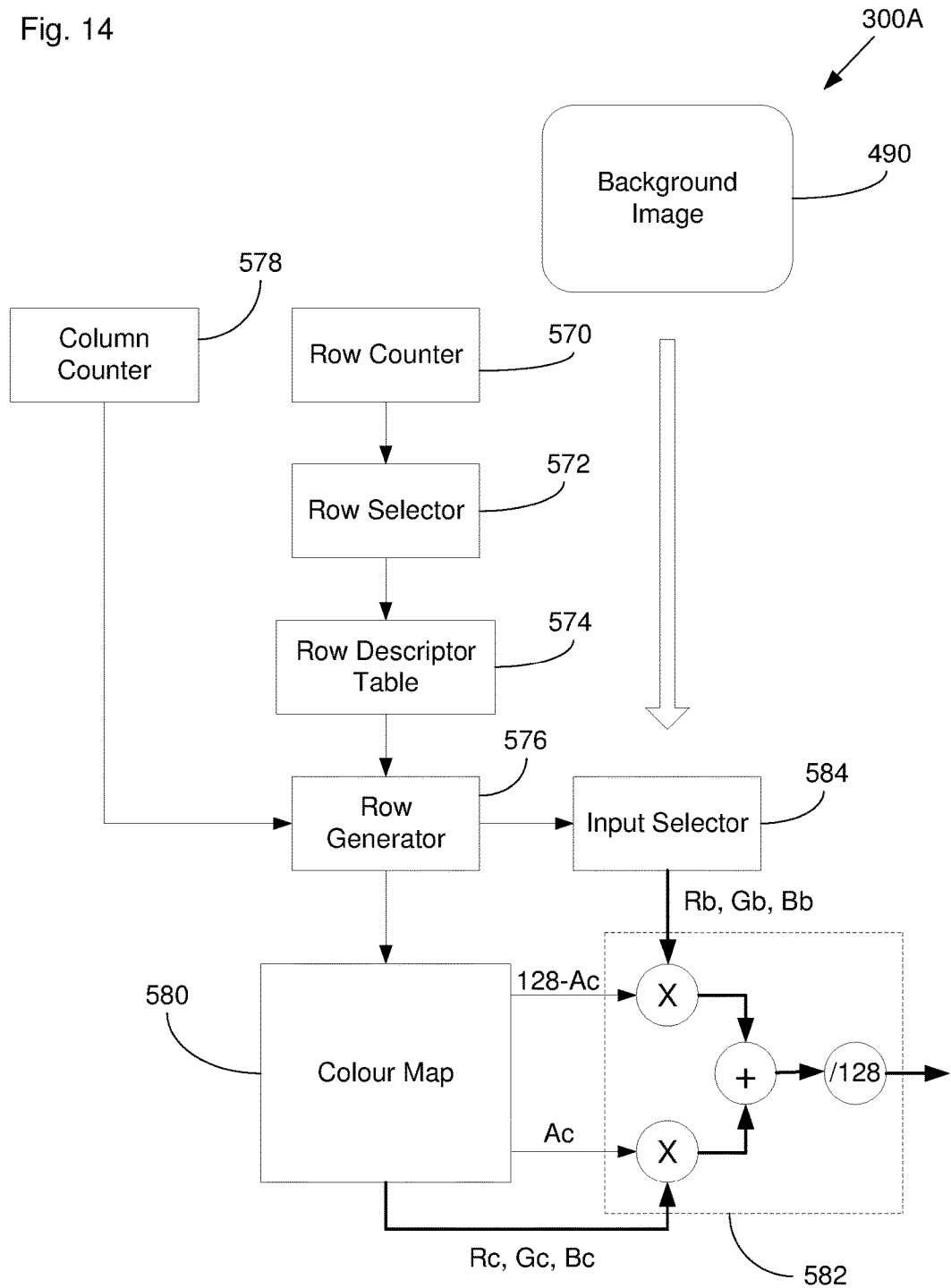
FIG. 14 shows a graphical representation of a method of image modification using a compressed image of a display element and implemented by the image modifier of the user station.

FIG. 14 shows a schematic block diagram of the compressed image element screen modifier sub-function 300A which carries out operations 462 and 464. The common background image 490 has been received from the KVM switch. Image row counter 570 selects an image row selector instruction 572, which is used to select an image row descriptor in the image row descriptor table 574. The image row descriptor which is used by the image row generator 576, in conjunction with a column counter 578, to create an image row comprising of 4-bit data which is converted into an image row of Ac, Rc, Gc, Bc data by image colour map 580. The Ac, Rc, Gc, Bc image row data is used by an image mixer 582 to blend the OSD sub-elements, e.g. the mask image at 462 or the highlighter image 510 at 464, with the background image data, Rb, Gb, Bb. The appropriate Rb, Gb, Bb data from the common background image 490 are selected by the an input selector 584 which also receives the output of the row generator 576.

Figure 15:
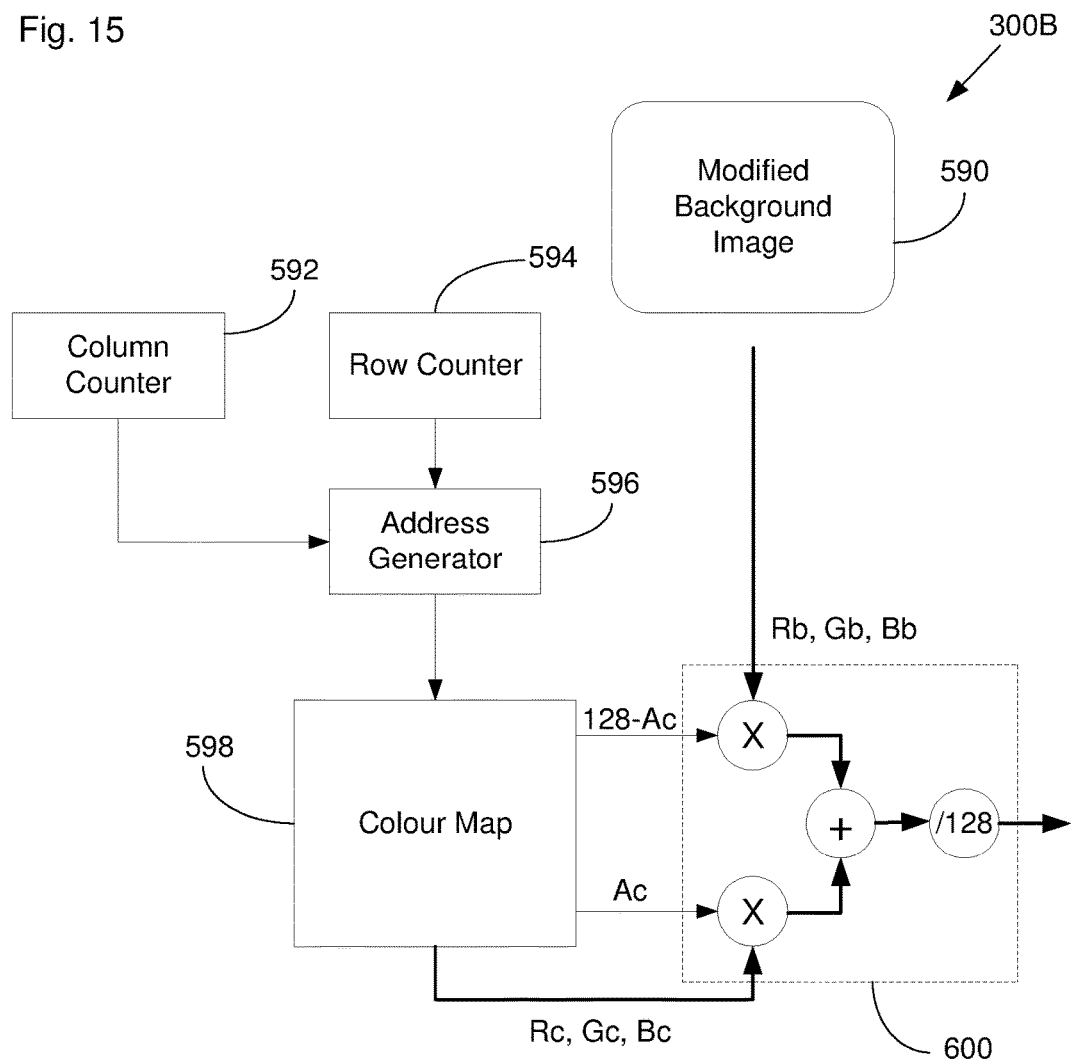
FIG. 15 shows a graphical representation of a method of image modification using a bitmap image of a display element and implemented by the image modifier of the user station.

FIG. 15 shows a schematic block diagram of the bitmapped image element screen modifier sub-function 300B which carries out operations 466 and 468. The partially modified background image data 590 output by step 464 is received and operated on. An image column counter 592 and image row counter 594 are used by address generator 596 to select an array entry in image colour map 598. The Ac, Rc, Gc, Bc image data from image colour map 598 is used by an image mixer 600 to blend the OSD sub-elements, the icon image 520 at step 466 and the pointer image 530 at step 468, with the partially modified background image data Rb, Gb, Bb.

The operation of the system 100 and use of the hybrid display on-screen menu 540 is as follows. The administrator sets up computer names and the computer access rights for each user station 108. The administrator also select the hotkey sequence that will be used to trigger the on-screen selection menu 540. The user station 108 monitors the data received from the keyboard 120 and signals the KVM switch 100 over the fourth pair of cable 112 that a request to view the on screen selection menu 540 has been received.

When this event is detected, any current computer links between the user station 108 and computer 106 are broken by the KVM switch and the user station 108 is switched to receive the common OSD picture image 490 from the KVM switch 102. This image includes boxes 492-498 that show the current video output for each computer 106. At the same time the KVM switch checks the computer access rights of the user station 108 and signals to the user station 108 to blank out portions of the image 490 relating to computers that the user station can't access, e.g. 498, by applying mask 500. Additionally, the KVM switch signals the user station over the fourth pair of cable 105 to instruct it to place a cursor image 530 on the screen, its position on the screen being determined by the user station. Similarly the KVM switch signals the user station to place a highlighter image 548 on the screen, with its position on the screen being determined by the user station. As the user moves the mouse 472, the user station 108 updates 468 the location of the cursor on the screen. The user station 108 also signals the KVM switch the region of the screen that contains the cursor. The KVM switch will update data relating to the icon image or mask image in response to these signals and send that to the user station 108 so that it can modify the on-screen display appropriately for the specific user. If the user presses the enter key on the keyboard or clicks the mouse then the KVM switch responds by selecting the computer that corresponds to the location of the cursor. For example if the cursor is located within the box 548 representing computer two, then computer two will be selected.

The computer selection menu is formulated in a way that is friendly to the use of touch screens, as exemplified by FIG. 13. Icons 520 are provided on the screen that enable the user to select one of the four different types of connection (if user access rights permit) by touching on one of four visual icons (see e.g. FIG. 10). Video only mode 522 delivers the video with no keyboard or mouse control and no guarantee that the connection is private (i.e. other users can view the video at the same time). Shared access mode 524 delivers video with shared keyboard and mouse control. The keyboard and mouse control is passed between users on an inactivity timeout basis which is usually set to 2 seconds. In shared access mode there is no guarantee that the connection is private. In private mode 528, the video and USB control is dedicated to the user and no other users can see the video or use the keyboard and mouse at the same time. In exclusive mode 526, the user has exclusive use of the keyboard and mouse connection to the computer but other users can see the video.

The user station is configured to detect the connection of a touch screen 118 to a user station 108 and interpret finger touch events in a similar way to mouse clicks and movements. Therefore the system 100 is able to detect when the user touches one of the currently displayed icons 520 and make the appropriate computer connection. The computer selection screen 560 can be triggered by a fast long swipe of the screen. The trigger action can be defined in software over the KVM switch's web interface.

Overall the various aspects of the invention deliver a visually compelling and modern user interface without requiring complex circuitry, such as frame stores, within the user stations 108, KVM switch 102 or dongles 110.

The invention solves a number of problems by implementing a hybrid on-screen display scheme. The underlying or background portion of the on-screen display is common to all users. When used as a computer selection menu, each computer is represented by a rectangle on a full screen image that includes information about the computer and may optionally include a thumbnail 492-498 of each computer's current video output. This common full screen menu 490 is generated in the KVM switch by a common microprocessor circuit 402 that has sufficiently powerful graphics capability to deliver the desired video experience.

Each user station contains lower complexity circuitry that is capable of performing simple modifications to the underlying or background video image such as blanking or dimming areas of the screen, drawing a red highlighter border around a currently selected rectangle, adding icons or adding a cursor. These functions can be implemented within an FPGA 306 without requiring a full frame store. The on-screen display selection menu 540 that is delivered to the user is therefore both graphically rich and personalised for each user station 108 without requiring either an on-screen display circuit in the user station 108 or multiple on-screen display circuits in the KVM switch.

This approach delivers many advantages. Regardless of the number of users that are to be supported, the microprocessor circuit 402 within the KVM switch only needs to generate a single video output for the background portion of the on-screen display and this only requires a single connection 438 to the video switching matrix 420 within the KVM switch. This dramatically reduces the complexity of both the on-screen display generation circuitry and the video switching circuitry needed to support it whilst also enhancing flexibility.

For example a prior art approach would need 8 OSD circuits and 8 video ports to service 8 users. Whereas the invention uses 1 OSD circuit and 1 video port only, regardless of the number of users. Therefore in the prior art system a 32 port video switch circuit could only support a fixed configuration of, say, 8 users by 16 computers as 8 ports of the video switching matrix would always be needed to connect in the OSD function. In contrast, the invention could support 8 users by 23 computers or 10 users by 21 computers or 15 users by 16 computers using the same 32 port matrix circuit.

Furthermore, ports on video matrix switch circuits may often be set as inputs or output via software. When coupled with hybrid on-screen display scheme of the invention, this means that it is possible for the user to flexibly configure the ports of the KVM switch as user ports or computer ports depending on their requirements. This flexibility enhances the value of the system as it means that the system can be configured to meet a wider spectrum of user requirements.

A further advantage of generating the on-screen menu background portion in the KVM switch is that it can which greatly enhances the visual appeal of the selection menu. The video output from all of the attached computers is passing through the KVM switch. Hence, all the video output is accessible from a port 436 on the video switch matrix 420 and so the microprocessor 402 can capture video images from each computer by connecting to each video source in turn and capturing the video pixels into memory. These stored images are then used by the microprocessor circuit 402 to generate thumbnails to enhance the visual appearance of the computer selection screen 540. This provides an improved user experience as the user can see a small image of the screen of the computers that they may switch to.

The popularity of tablets and other touch-screen devices means that users will often be dissatisfied if they are not able to interact with computer systems via a touch screen. The highly visual nature of the hybrid OSD computer selection menu 560 lends itself perfectly to intuitive touch screen driven functionality. The computer selection menu has therefore been specifically designed to accommodate easy touch screen operation.

Various modifications, additions and alterations to the specific embodiments described above will be apparent to a person of ordinary skill in the art in light of the discussion and explanation of the invention provided above.

The invention claimed is:

1. A switching device for selectively connecting a user station to one of a plurality of computers, the switching device comprising;
   a plurality of computer interfaces;
   a user station interface;
   a video switch operable to selectively provide a video path between a one of the computer interfaces and the user station interface; and
   video processing circuitry configured to form a background image for a user interface, selectively receive video data from the video switch from said one of the computer interfaces and generate a thumbnail screen image for the computer from the received video data and include the thumbnail screen image in the background image and output video data representing the background image to the video switch, wherein the video switch is further operable to selectively output the video data representing the background image to the user station interface.

2. The switching device of claim 1, wherein the video processing circuitry is further configured to selectively receive video data from the video switch from each computer interface and generate a respective thumbnail screen image for each computer from the received video data and include the thumbnail screen images in the background image.

3. The switching device of claim 1 and further comprising a data switch operable to selectively provide a data path between the user station interface and a one of the computer interfaces.

4. The switching device of claim 1, wherein the video switch is configurable by software to vary the number of video input ports and/or video output ports.

5. The switching device of claim 1, and further comprising a network interface and including software providing a network accessible administration function.

6. The switching device of claim 1, and further comprising a plurality of user station interfaces and wherein the video switch is operable to selectively provide a video path between any one of the computer interfaces and any one of the user station interfaces.

7. The switching device of claim 6, wherein the video switch is further operable to selectively output the video data representing the background image to any one of the user station interfaces.

8. The switching device of claim 6, wherein the video switch is operable to selectively provide a first video path between a one of the computer interfaces and a first one of the user station interfaces while also providing a second video path between the video processing circuitry and a second one of the user station interfaces.

9. The switching device of claim 1, wherein the video processing circuitry includes a microprocessor, a video receive circuit in communication with an output port of the video switch and a video transmit circuit in communication with an input port of the video switch and wherein the video receive circuit and video transmit circuit are implemented by a programmable logic device.

10. The switching device of claim 1, wherein the video processing circuitry is further configured to pass image data representing one or a plurality of user interface elements to the video switch for output to the user station interface.

11. The switching device of claim 10, wherein the image data representing the or each user interface element is compressed image data or bitmap image data.

12. The switching device of claim 1, wherein the background image includes a frame defining a plurality of regions, each region being associated with a respective one of the plurality of computers.

13. A system comprising the switching device of claim 1 and one or a plurality of user stations, wherein each user station comprises:
an input connector for receiving an input video signal;
an output connector for outputting an output video signal to a display device;
a video processing device in communication with the input connector and the output connector and configured to modify video data representing a background portion of a user interface to add a further user interface element which customises the user interface to be specific to the user station as the video data is received from the input connector and to transmit the modified video data to the output connector.

14. The system as claimed in claim 13 and further comprising a plurality of dongles.

15. The system as claimed in claim 14, wherein each dongle includes:
a digital video interface for receiving digital video signals from a computer;
circuitry configured to measure the frequency of a digital video clock signal;
a transceiver arranged to provide a data channel over a twisted pair; and
an interface for a CATx cable wherein video colour data and data indicating the measured frequency of the digital video clock signal are passed to the interface for transmission over a CATx cable.

16. The system as claimed in claim 15, wherein the or each user station includes:
circuitry configured to reconstitute and output a digital video signal over the output connector from video colour data and data indicating the measured frequency of the digital video clock signal received over the input connector.

17. The system of claim 13 wherein the or each user station is connected to the switching device by a respective CATx cable and the or each dongle is connected to the switching device by a respective CATx cable.

18. The system as claimed in claim 13, wherein, for each user station, the video processing device is configured to use alpha blending to modify the video data.

19. The system as claimed in claim 13, wherein, for each user station, the video processing device is further configured to modify the video data by using compressed image data representing the further user interface element.

20. The system as claimed in claim 13, wherein, for each user station, the video processing device is further configured to modify the video data by using bitmap image data representing the further user interface element.

21. The system as claimed in claim 20, wherein the compressed image data represents a first further user interface element and the bitmap image data represents a second further user interface element.

22. The system as claimed in claim 20, wherein the compressed image data and/or bitmap image data has been received via the input interface.

23. The system as claimed in claim 13, wherein, for each user station, the video processing device is further configured to reconstitute video data from video data received from the input connector and representing a video output of a video source and output the reconstituted video data to the output connector.

24. The system as claimed in claim 13, wherein, for each user station, the video processing device is a programmable logic device.

25. The system as claimed in claim 13, wherein the further user interface element comprises one or more of a mask image, a highlighter image, one or more icons or a pointer image.

26. The system as claimed in claim 13, wherein, for each user station, the input connector includes a connector for receiving a CATx cable connector and wherein the output connector is a digital video interface and includes a connector for receiving a digital video cable connector.

27. A method of providing a customised user interface to a user console including a display device, the method comprising:
generating a background image portion of a user interface at a switching device, wherein the back ground image portion includes a plurality of thumbnail images of respective screens of a plurality of computers;
transmitting video data representing the background image portion of the user interface to a user station of a user console;
modifying the video data at the user station as the video data is received at the user station using video data representing a user interface element that is specific to the user station; and
displaying the customised user interface on a display device attached to the user station.

28. The method of claim 27, further comprising:
transmitting the video data representing the user interface element that is specific to the user station from the switching device to the user station.

29. The method of claim 27, further comprising:
transmitting video data representing a further user interface element to the user station from the switching device to the user station; and
further modifying the video data at the user station using video data representing the further user interface element.

30. The method of claim 27, wherein generating the background image further comprises:

selectively sampling video data received from each of said plurality of computers at the switching device and storing video data representing the thumbnail image for each computer.

31. The method of claim 27, wherein the background image includes a frame defining a plurality of regions and wherein a respective thumbnail image is provided in each respective region.

32. The method of claim 27, wherein the user interface includes one or more user selectable icons and/or a pointer and/or a highlighter.

33. The method of claim 27, wherein the user interface includes one or more greyed out regions and/or one or more blacked out regions and/or one transparent regions corresponding to a currently pointed to computer.

34. The method of claim 27, further comprising:
converting a digital video signal into video colour data and data indicating a measured digital video clock frequency at a dongle connected to a digital video output of a computer;
transmitting the video colour data and data indicating the measured digital video clock frequency from the dongle to the switching device;
transmitting the video colour data and data indicating the measured digital video clock frequency from the switching device to the user station; and
reconstituting and outputting the digital video signal at the user station from the video colour data and data indicating the measured digital video clock frequency.

* * * * *